US010899321B2

(12) United States Patent
Tsuyama

(10) Patent No.: US 10,899,321 B2
(45) Date of Patent: Jan. 26, 2021

(54) OUTRIGGER DEVICE

(71) Applicant: TADANO LTD., Kagawa (JP)

(72) Inventor: Nobuyuki Tsuyama, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/637,474

(22) PCT Filed: Aug. 9, 2018

(86) PCT No.: PCT/JP2018/029853
§ 371 (c)(1),
(2) Date: Feb. 7, 2020

(87) PCT Pub. No.: WO2019/031568
PCT Pub. Date: Feb. 14, 2019

(65) Prior Publication Data
US 2020/0247368 A1    Aug. 6, 2020

(30) Foreign Application Priority Data

Aug. 9, 2017   (JP) .................................. 2017-153770

(51) Int. Cl.
*B60S 9/00*     (2006.01)
*B60S 9/12*     (2006.01)
*B66C 23/78*    (2006.01)

(52) U.S. Cl.
CPC ................. *B60S 9/12* (2013.01); *B66C 23/78* (2013.01)

(58) Field of Classification Search
CPC . B62D 53/085; B62D 1/66; B60S 9/08; B60S 9/16; B60S 9/12
See application file for complete search history.

(56) References Cited

U.S. PATENT DOCUMENTS 5,067,746 A * 11/1991 Baker ...................... B60D 1/66
                                                        248/354.5
5,711,504 A *  1/1998 Cusimano ................. B60S 9/08
                                                        248/354.3
(Continued)

FOREIGN PATENT DOCUMENTS

JP    H06-505468 A    6/1994
JP    2002-274783 A   9/2002
(Continued)

OTHER PUBLICATIONS

Oct. 30, 2018, International Search Report issued for related PCT Application No. PCT/JP2018/029853.
(Continued)

*Primary Examiner* — Hau V Phan
(74) *Attorney, Agent, or Firm* — Paratus Law Group, PLLC

(57) ABSTRACT

An outrigger device that is mounted on a vehicle and can switch between a usage state and a storage state includes: a lateral outrigger that extends in a vehicle width direction of the vehicle; a vertical outrigger that is extendable and is rotatably coupled to a leading end portion of the lateral outrigger; a first coupling member that constantly couples a first part of the vertical outrigger to the lateral outrigger and serves as a rotational center of the vertical outrigger; a second coupling member that can switch between a first state where a second part of the vertical outrigger is coupled to the lateral outrigger and a second state where the second part is uncoupled from the lateral outrigger; a conversion mechanism that converts a retraction of the vertical outrigger into an upward rotation of the vertical outrigger; and a safety device that prohibits an operation of the conversion mechanism in the first state and permits the operation of the conversion mechanism in the second state.

8 Claims, 13 Drawing Sheets

(56) References Cited

U.S. PATENT DOCUMENTS

| | | | | |
|---|---|---|---|---|
| 7,150,472 | B1* | 12/2006 | Schneider | B66C 23/80 |
| | | | | 280/766.1 |
| 8,220,833 | B2* | 7/2012 | Van Der Plaats | B60S 9/08 |
| | | | | 280/763.1 |
| 9,440,623 | B2* | 9/2016 | Pitts | B60D 1/66 |
| 2002/0053794 | A1* | 5/2002 | Fender | B60S 9/08 |
| | | | | 280/766.1 |
| 2007/0040369 | A1* | 2/2007 | Lotman | B60S 9/16 |
| | | | | 280/763.1 |
| 2016/0001749 | A1* | 1/2016 | Kimener | B62D 53/085 |
| | | | | 414/800 |
| 2016/0023641 | A1* | 1/2016 | Klassy | B60S 9/08 |
| | | | | 280/766.1 |

FOREIGN PATENT DOCUMENTS

| | | | |
|---|---|---|---|
| JP | 2005-119800 A | 5/2005 |
| JP | 2013-071495 A | 4/2013 |
| JP | 2013-220860 A | 10/2013 |
| JP | 2017-019633 A | 1/2017 |

OTHER PUBLICATIONS

Oct. 30, 2018, International Search Opinion issued for related PCT Application No. PCT/JP2018/029853.

* cited by examiner

OUTRIGGER DEVICE

CROSS REFERENCE TO PRIOR APPLICATION

This application is a National Stage Patent Application of PCT International Patent Application No. PCT/JP2018/029853 (filed on Aug. 9, 2018) under 35 U.S.C. § 371, which claims priority to Japanese Patent Application No. 2017-153770 (filed on Aug. 9, 2017), which are all hereby incorporated by reference in their entirety.

TECHNICAL FIELD

The present invention relates to an outrigger device. More specifically, the present invention relates to, for example, an outrigger device capable of storing a vertical outrigger upward in a loading truck crane.

BACKGROUND ART

As illustrated in FIG. 11, a loading truck crane 100 has a small crane 120 that is mounted on a vehicle frame 113 between a cab 111 and a cargo bed 112 of a general-purpose truck 110. The small crane 120 is provided on a base 121 fixed onto the vehicle frame 113. An outrigger device 122 is attached to the base 121.

In general, the outrigger device 122 includes a lateral outrigger 123 that is laterally fixed to the base 121, and a vertical outrigger 124 that is vertically fixed to a leading end of the lateral outrigger 123. The vertical outrigger 124 includes a float at a lower end. At the start of work (hereinafter, also referred to as a "usage state of the outrigger device"), the outrigger device 122 overhangs the lateral outrigger 123 and extends the vertical outrigger 124; and thereby the float is grounded. Accordingly, the stability of the loading truck crane 100 is secured. In addition, at the end of work (hereinafter, also referred to as a "storage state of the outrigger device"), the outrigger device 122 retracts the vertical outrigger 124 and draws in the lateral outrigger 123; and thereby, the outrigger device 122 is stored. The lateral width of the outrigger device in such storage state should not exceed the width of the vehicle frame from the viewpoint of securing safety during traveling.

Patent Literature 1 discloses a structure of an outrigger device which can prevent interference between auxiliary equipment or a fuel tank of the truck and the vertical outrigger in the storage state. In such structure disclosed in Patent Literature 1, a boss which is provided in a base end portion (upper end portion in the usage state) of the vertical outrigger is rotatably supported on a bearing that is provided at a side end (outer end portion in a vehicle width direction) of the lateral outrigger. When the vertical outrigger rotates around the boss, the vertical outrigger is stored with a leading end portion (lower end portion in the usage state) upward.

By the way, in the related art described above, in order to obey a limit that an outer end surface of the vertical outrigger should be positioned within the maximum width of the vehicle frame in the storage state, an outer end of the lateral outrigger in the vehicle width direction is required to be positioned inward in the vehicle width direction by the dimension of the vertical outrigger in the vehicle width direction. For this reason, the length of the lateral outrigger in the vehicle width direction is short; and thereby, it is not possible to increase the overhang width of the outrigger in the usage state. As a result, the related art disclosed in Patent Literature 1 has limitation in improving the work stability of the crane.

In addition, Patent Literature 2 discloses an outrigger device including an extendable lateral outrigger, and a vertical outrigger that is rotatably attached to a side surface (front or rear side wall in a forward and rearward direction of a truck body) of a leading end portion of a lateral beam inner casing of the lateral outrigger.

Patent Literature 3 discloses an outrigger device including a vertical outrigger and an actuator for rotating the vertical outrigger. This actuator is a jack cylinder, and is built in the vertical outrigger. Namely, such actuator includes an extendable rod that is provided between a lower end of the vertical outrigger and a leading end of the lateral outrigger. The extendable rod converts the retraction operation of the vertical outrigger into the rotational operation of the vertical outrigger. Then, in the storage state, the vertical outrigger is held with a leading end upward.

In the foregoing outrigger devices disclosed in Patent Literatures 2 and 3, in the usage state, the vertical outrigger is fixed to the lateral outrigger with a coupling pin. On the other hand, it is necessary to pull out the coupling pin in the storage operation of the vertical outrigger. However, in a case where the pull-out of the coupling pin is forgotten, the pin or a drive mechanism of the vertical outrigger is damaged, which is a problem.

CITATION LIST

Patent Literature

Patent Literature 1: JP 2002-274783 A
Patent Literature 2: JP 2013-71495 A
Patent Literature 3: JP 6-505468 A

SUMMARY OF THE INVENTION

Problems to be Solved by the Invention

The present invention is made in light of the foregoing circumstances, and an object of the present invention is to provide a technique capable of reducing the possibility of causing damage to a drive mechanism during a storage operation in an outrigger device in which a vertical outrigger is stored upward.

Solutions to Problems

According to a first aspect of the present invention, there is provided an outrigger device that is mounted on a vehicle and can switch between a usage state and a storage state, the device including: a lateral outrigger that extends in a vehicle width direction of the vehicle; a vertical outrigger that is extendable and is rotatably coupled to a leading end portion of the lateral outrigger; a first coupling member that constantly couples a first part of the vertical outrigger to the lateral outrigger and serves as a rotational center of the vertical outrigger; a second coupling member that can switch between a first state where a second part of the vertical outrigger is coupled to the lateral outrigger and a second state where the second part is uncoupled from the lateral outrigger; a conversion mechanism that converts a retraction of the vertical outrigger into an upward rotation of the vertical outrigger; and a safety device that prohibits an operation of the conversion mechanism in the first state and permits the operation of the conversion mechanism in the second state.

Effects of the Invention

According to the present invention, it is possible to provide a technique capable of reducing the possibility of causing damage to a drive mechanism during a storage operation.

DESCRIPTION OF EMBODIMENTS

Embodiment

An outrigger device according a first embodiment of the present invention will be described with reference to the drawings.

Basic Structure of Outrigger Device 1

Figure 6:
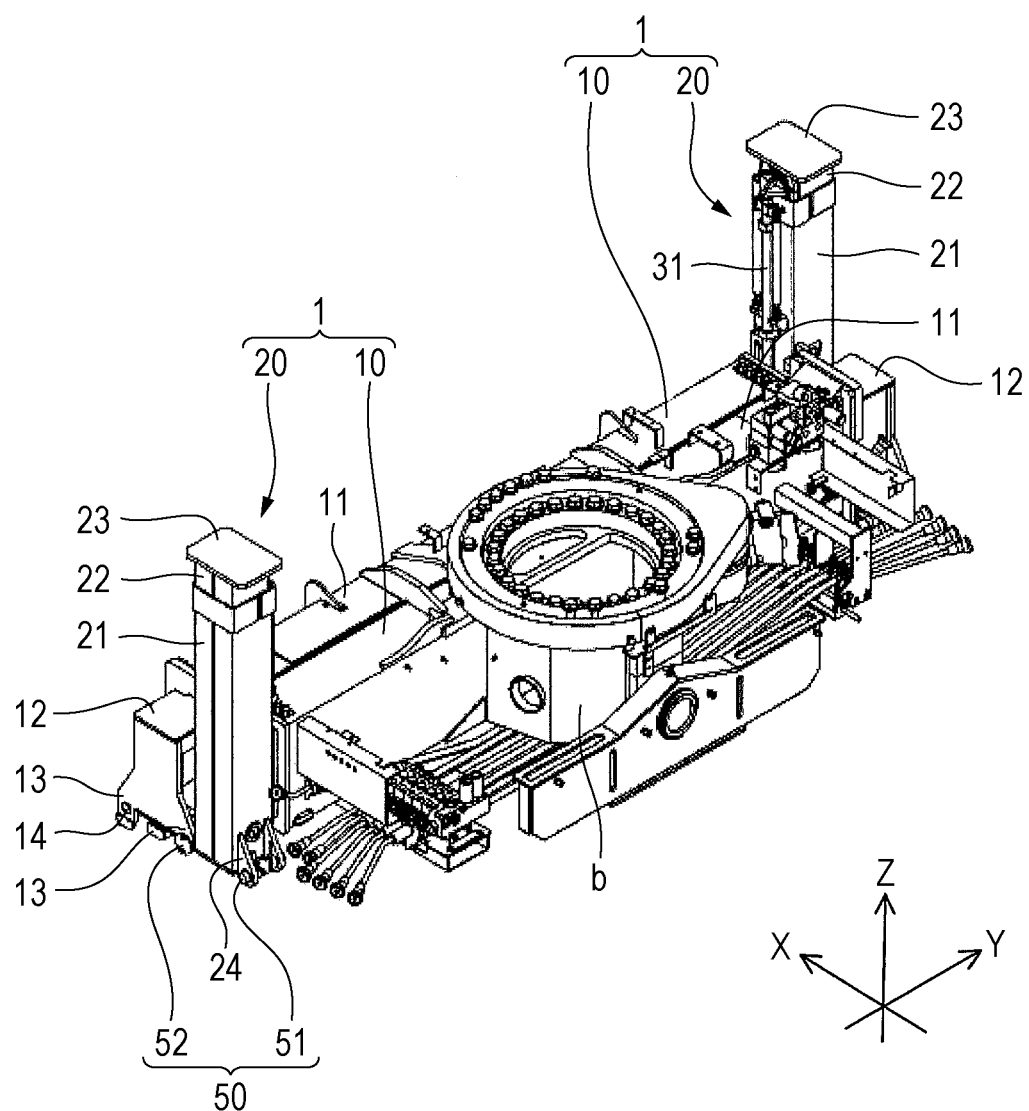
FIG. 6 is a perspective view of an outrigger device to which the present invention is applied.
Figure 7:
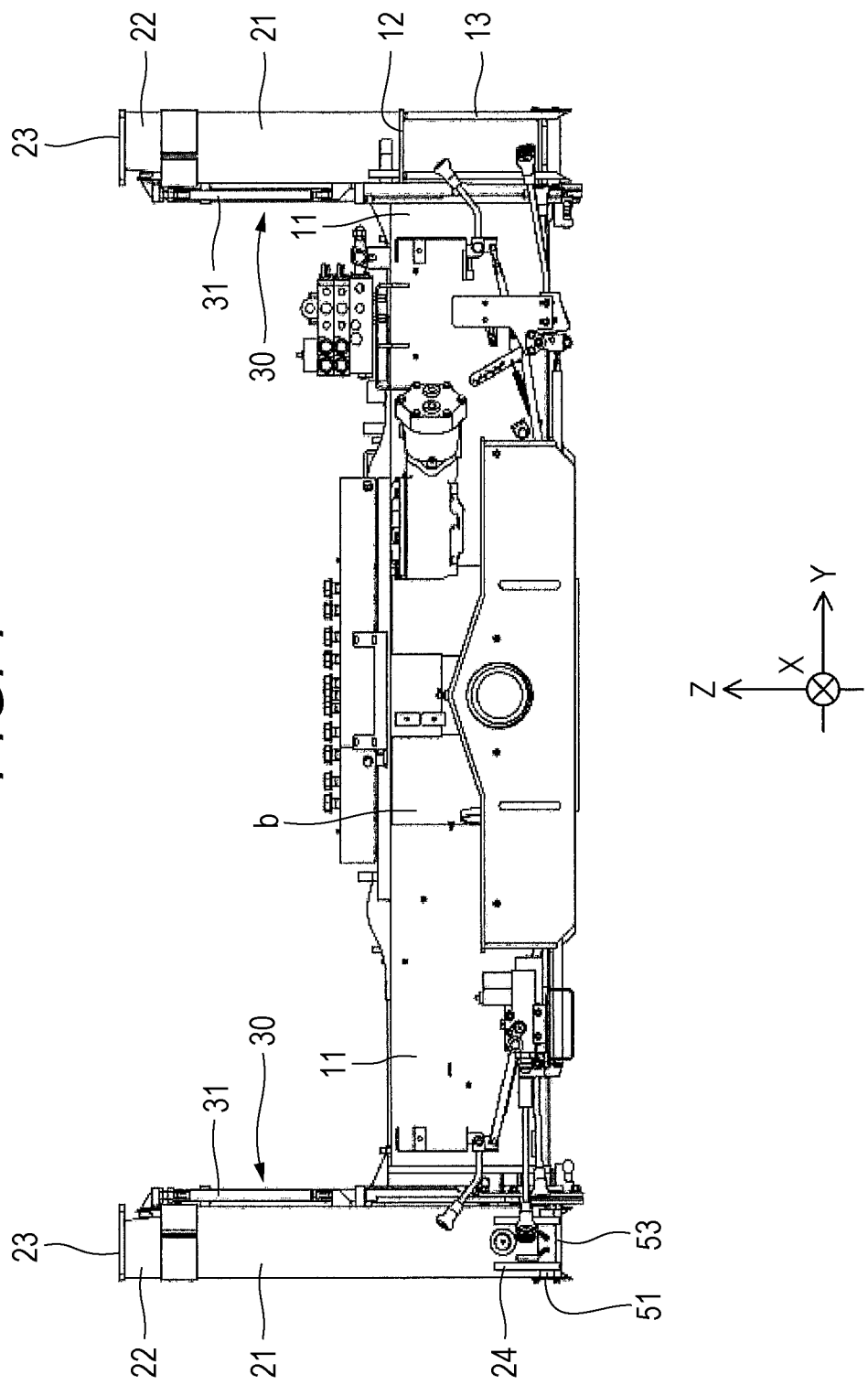
FIG. 7 is a front view of the outrigger device in FIG. 6.
Figure 11:
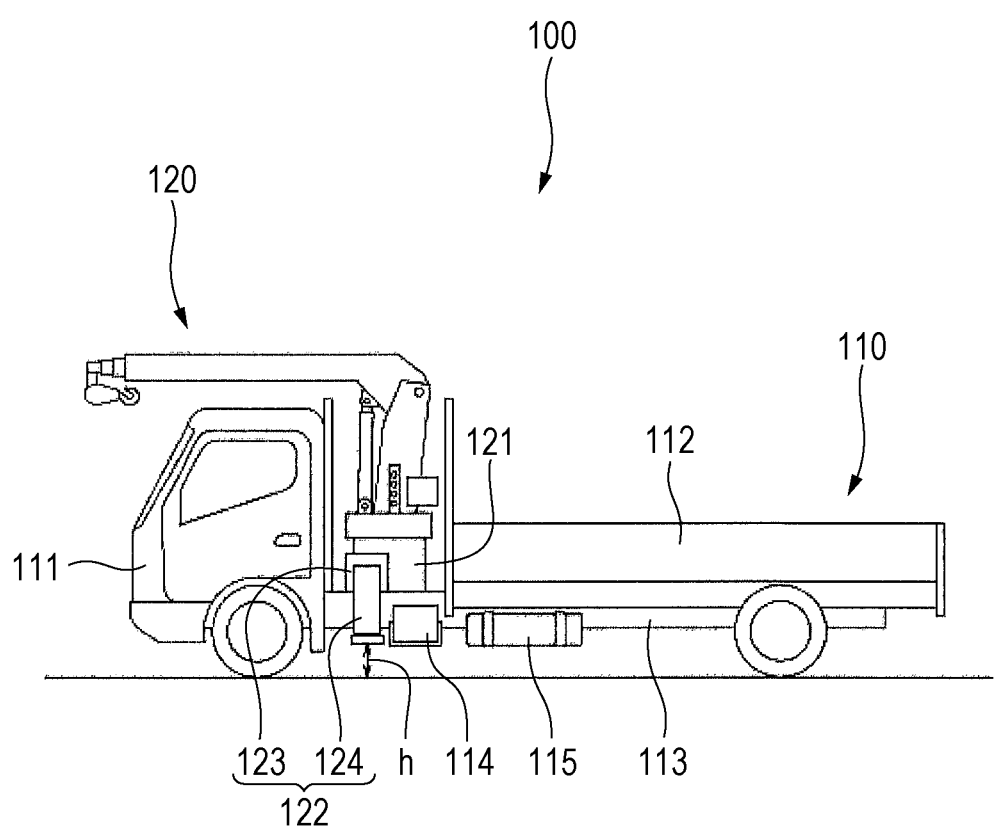
FIG. 11 is a schematic description view of a loading truck crane.

As illustrated in FIGS. 6 and 7, an outrigger device 1 according to the first embodiment of the present invention is mounted on a loading truck crane. A small crane includes a base 121 (refer to FIG. 11). The base 121 is fixed to a vehicle frame 113 (refer to FIG. 11) of a truck.

Then, a pair of right and left outrigger devices 1 (also referred to as a front outrigger and a rear outrigger) are fixed to the base 121. The outrigger devices 1 are configured to be mirrored on the right and left sides (in other words, symmetrical in a vehicle width direction). Incidentally, in the following description of the outrigger device 1 and members forming the outrigger device 1, unless otherwise specified, the "vehicle width direction", a "forward and rearward direction", and an "upward and downward direction" refer to directions of a vehicle (for example, a general-purpose truck 110 in FIG. 11) in a state where the outrigger device 1 is assembled to the vehicle. In the orthogonal coordinates system (X, Y, Z) illustrated in FIGS. 6 and 7, the forward and rearward direction, the vehicle width direction, and the upward and downward direction correspond to an X direction, a Y direction, and a Z direction, respectively. In FIGS. 6 and 7, a + side in the X direction is the front.

The pair of right and left outrigger devices 1 include a pair of lateral outriggers 10 that are provided to extend in a lateral direction (also referred to as a rightward and leftward direction or the vehicle width direction) of a vehicle frame, and a pair of vertical outriggers 20 that are coupled to leading end portions (outer end portions in the vehicle width direction) of the lateral outriggers 10. Incidentally, the drawings illustrate a state where leading end portions of the vertical outriggers 20 are stored upward.

The pair of right and left outrigger devices 1 have substantially the same configuration. For this reason, hereinafter, the description of the configuration of the outrigger device 1 will focus on one (specifically, the front side) outrigger device 1 (also referred to as the front outrigger). The other (specifically, the rear side) outrigger device 1 (also referred to as the rear outrigger) will be described as appropriate.

Incidentally, the pair of right and left outrigger devices 1 are disposed adjacent to each other in the forward and rearward direction. The mode of disposition of the pair of right and left outrigger devices 1 will be described later. Hereinafter, a state where the lateral outriggers 10 of the pair of outrigger devices 1 are extended and a state where leading ends (specifically, floats 23) of the vertical outriggers 20 face downward (also referred to as a state where the leading ends can be grounded) are referred to as a usage state or a deployed state of the outrigger devices 1.

On the other hand, a state where the lateral outriggers 10 of the pair of outrigger devices 1 are retracted and the leading ends of the vertical outriggers 20 face upward (the state illustrated in FIGS. 6 and 7) is referred to as a storage state of the outrigger devices 1.

The lateral outrigger 10 extends and retracts in the vehicle width direction (namely, extendable in the vehicle width direction) to be able to transit between a retracted state and an extended state. Specifically, the lateral outrigger 10 includes a lateral beam outer casing 11 and a lateral beam inner casing 12. The lateral beam outer casing 11 includes an opening in a leading end portion (outer end portion in the vehicle width direction). The lateral beam outer casing 11 is fixed to the vehicle frame 113 (refer to FIG. 11).

The lateral beam inner casing 12 is inserted into an inner space of the lateral beam outer casing 11 from the opening of the lateral beam outer casing 11. In this state, a leading end portion (in other words, an outer end portion in the vehicle width direction) of the lateral beam inner casing 12 protrudes outward from the opening of the lateral beam outer casing 11 in the vehicle width direction.

The lateral beam inner casing 12 can be moved with respect to the lateral beam outer casing 11 in the vehicle width direction by a hydraulic cylinder (not illustrated) or manually. As the lateral beam inner casing 12 moves with respect to the lateral beam outer casing 11 in the vehicle width direction, the lateral outrigger 10 extends and retracts in the vehicle width direction.

In the case of one outrigger device 1, when the lateral outrigger 10 is in the retracted state, the lateral beam inner casing 12 moves outward (toward the left side in FIGS. 6 and 7 which is also referred to as a first direction) with respect to the lateral beam outer casing 11 in the vehicle width direction to enter into the extended state.

On the other hand, in the case of the other outrigger device 1 (also referred to as the rear outrigger), when the lateral outrigger 10 is in the retracted state, the lateral beam inner casing 12 moves outward (toward the right side in FIGS. 6 and 7 which is also referred to as a second direction) with respect to the lateral beam outer casing 11 in the vehicle width direction to enter into the extended state.

Hereinafter, the mode of disposition of the pair of right and left outrigger devices 1 will be described. In the mode of disposition of the outrigger devices 1 according to the present embodiment, the dimension of the outrigger device 1 in the usage state in the vehicle width direction is increased, and thereby contributing to improve the stability of the crane.

As illustrated in FIG. 6, the pair of right and left outrigger devices 1 are disposed offset in the forward and rearward direction. Specifically, the lateral outrigger 10 (also referred to as a rear lateral outrigger) of the other (rear side) outrigger device 1 is disposed adjacent to the lateral outrigger 10 (also referred to as a front lateral outrigger) of one (front side) outrigger device 1 in the forward and rearward direction, and is adjacently positioned to the rear side thereof.

The lateral outrigger 10 of one (front side) outrigger device 1 and the lateral outrigger 10 of the other (rear side) outrigger device 1 are symmetrically disposed in the vehicle width direction. In addition, the lateral outrigger 10 of one (front side) outrigger device 1 and the lateral outrigger 10 of the other (rear side) outrigger device 1 are also disposed offset in the vehicle width direction.

Specifically, the leading end portion (left end portion in FIG. 6) of the lateral outrigger 10 (specifically, the lateral beam inner casing 12) of one (front side) outrigger device 1 protrudes more outward (toward the left side in FIG. 6) in the vehicle width direction than a base end surface (left end surface in FIG. 6) of the lateral outrigger 10 (specifically, the lateral beam outer casing 11) of the other (rear side) outrigger device 1.

The leading end portion (right end portion in FIG. 6) of the lateral outrigger 10 (specifically, the lateral beam inner casing 12) of the other (rear side) outrigger device 1 protrudes more outward (toward the right side in FIG. 6) in the vehicle width direction than a base end surface (right end surface in FIG. 6) of the lateral outrigger 10 (specifically, the lateral beam outer casing 11) of one (front side) outrigger device 1.

In other words, the leading end portion of the lateral outrigger 10 (specifically, the lateral beam inner casing 12) of each of the pair of outrigger devices 1 protrudes more outward in the vehicle width direction than the base end surface of the lateral outrigger 10 (specifically, the lateral beam outer casing 11) of the outrigger device 1 adjacent thereto. However, in the storage state, the leading end portions of the lateral outriggers 10 (specifically, the lateral beam inner casings 12) of the pair of outrigger devices 1 are positioned in the vehicle width direction inside both ends of the vehicle in the vehicle width direction.

A substantially rectangular parallelepiped space, which is positioned behind the leading end portion (left end portion in FIG. 6) of the lateral outrigger 10 (specifically, the lateral beam inner casing 12) of one (front side) outrigger device 1 to overlap the lateral outrigger 10 (specifically, the lateral beam outer casing 11) of the other (rear side) outrigger device 1 in the vehicle width direction, is referred to as a first vertical outrigger disposition space.

In addition, a substantially rectangular parallelepiped space, which is positioned in front of the leading end portion (right end portion in FIG. 6) of the lateral outrigger 10 (specifically, the lateral beam inner casing 12) of the other (rear side) outrigger device 1 to overlap the lateral outrigger 10 (specifically, the lateral beam outer casing 11) of one (front side) outrigger device 1 in the vehicle width direction, is referred to as a second vertical outrigger disposition space.

In the storage state of the pair of outrigger devices 1, portions (base end portions) of the vertical outriggers 20 are stored in the first vertical outrigger disposition space and the second vertical outrigger disposition space. In such storage state, each of the vertical outriggers 20 of the pair of outrigger devices 1 is erected with the leading end portion thereof upward.

In addition, in the storage state, each of the vertical outriggers 20 of the pair of outrigger devices 1 does not protrude more outward in the vehicle width direction than a leading end of the lateral outrigger 10 (specifically, the lateral beam inner casing 12). In the present embodiment, outer surfaces of the vertical outrigger 20 and the lateral outrigger 10 in the width direction are positioned in the same plane. When the pair of outrigger devices 1 transition from the storage state to the usage state, the lateral outriggers 10 of the pair of outrigger devices 1 extend opposite to each other in the vehicle width direction.

The vertical outrigger 20 is provided to be able to move together with the lateral outrigger 10 in the vehicle width direction. The vertical outrigger 20 can extend and retract in the own axial direction. Specifically, the vertical outrigger 20 includes a jack outer casing 21, a jack inner casing 22, and the float 23. The jack outer casing 21 corresponds to an example of one of a first vertical outrigger element and a second vertical outrigger element. The jack inner casing 22 corresponds to an example of the other of the first vertical outrigger element and the second vertical outrigger element.

The jack outer casing 21 includes an opening at a leading end (upper end in FIGS. 6 and 7). The jack inner casing 22 is disposed in an inner space of the jack outer casing 21 so as to be able to move with respect to the jack outer casing 21 in the axial direction. A leading end portion of the jack inner casing 22 protrudes from the opening of the jack outer casing 21. The float 23 is provided in the leading end portion of the jack inner casing 22.

In the usage state, the vertical outrigger 20 is erected with the leading end facing downward. On the other hand, in the storage state, the vertical outrigger 20 is erected with the leading end upward.

The vertical outrigger 20 includes a jack cylinder (not illustrated) between the jack outer casing 21 and the jack inner casing 22 (for example, inside the vertical outrigger 20). The jack cylinder moves the jack inner casing 22 with respect to the jack outer casing 21. The vertical outrigger 20 extends and retract in the own axial direction based on such movement of the jack inner casing 22.

As illustrated in FIG. 6, the lateral outrigger 10 includes a pair of first brackets 13. In addition, the vertical outrigger 20 includes a pair of second brackets 24.

The lateral outrigger 10 and the vertical outrigger 20 are coupled to each other via the pair of first brackets 13 fixed to the lateral outrigger 10 and the pair of second brackets 24 fixed to the vertical outrigger 20. The pair of first brackets 13 are plate-shaped members that are integrally formed, and are fixed to the leading end portion of the lateral beam inner casing 12 of the lateral outrigger 10.

The lateral outrigger 10 and the vertical outrigger 20 are coupled to each other via the pair of first brackets 13 fixed to the lateral outrigger 10 and the pair of second brackets 24 fixed to the vertical outrigger 20. The pair of first brackets 13 are plate-shaped members that are integrally formed, and are fixed to the leading end portion of the lateral beam inner casing 12 of the lateral outrigger 10.

The pair of first brackets 13 are spaced apart from each other in the forward and rearward direction. Each of the pair of first brackets 13 includes a pin insertion hole 14. The pair of second brackets 24 are provided spaced apart from each other in the forward and rearward direction in the base end portion of the jack outer casing 21 of the vertical outrigger 20. Each of the pair of second brackets 24 includes a pin insertion hole. A coupling pin 50 is inserted into the pin insertion hole.

The coupling pin 50 may include a deployment lock pin 51, a fulcrum pin 52, and the like. The deployment lock pin 51 and the fulcrum pin 52 have central axes parallel to the vehicle width direction. In the present embodiment, the deployment lock pin 51 and the fulcrum pin 52 are provided adjacent to each other with a predetermined gap therebetween in the forward and rearward direction. In the usage state, the positions of the deployment lock pin 51 and the fulcrum pin 52 in the upward and downward direction are the same (or substantially the same). In the present embodiment, the coupling pin 50 is formed of the deployment lock pin 51 and the fulcrum pin 52; however, other pins may be added thereto.

The fulcrum pin 52 is constantly inserted into the pin insertion hole 14 of one (for example, rear side) first bracket 13, and one (for example, rear side) second bracket 24. In a storage operation, the fulcrum pin 52 serves as a rotational fulcrum of the vertical outrigger 20.

In other words, the fulcrum pin 52 constantly couples a first part (specifically, one first bracket 13) of the lateral outrigger 10 to a first part (specifically, one second bracket 24) of the vertical outrigger 20. The fulcrum pin 52 corresponds to an example of a first coupling member.

In the usage state, the deployment lock pin 51 is inserted into the pin insertion hole 14 of the other (for example, front side) first bracket 13 and the pin insertion hole of the other (for example, front side) second bracket 24. In the usage state, the deployment lock pin 51 couples a second part (specifically, the other first bracket 13) of the lateral outrigger 10 to a second part (specifically, the other second bracket 24) of the vertical outrigger 20.

On the other hand, in the storage operation and the storage state, the deployment lock pin 51 is removed from the pin insertion hole 14 of the other first bracket 13. In other words, in the storage operation and the storage state, the deployment lock pin 51 uncouples the second part (specifically, the other first bracket 13) of the lateral outrigger 10 from the second part (specifically, the other second bracket 24) of the vertical outrigger 20. The deployment lock pin 51 corresponds to an example of a second coupling member. The second coupling member may not have a pin-like structure. The second coupling member may have various structures where the second coupling member couples the second part of the lateral outrigger 10 to the second part of the vertical outrigger 20 in the usage state, and uncouples the second part of the lateral outrigger 10 from the second part of the vertical outrigger 20 in the storage operation and the storage state.

Figure 8:
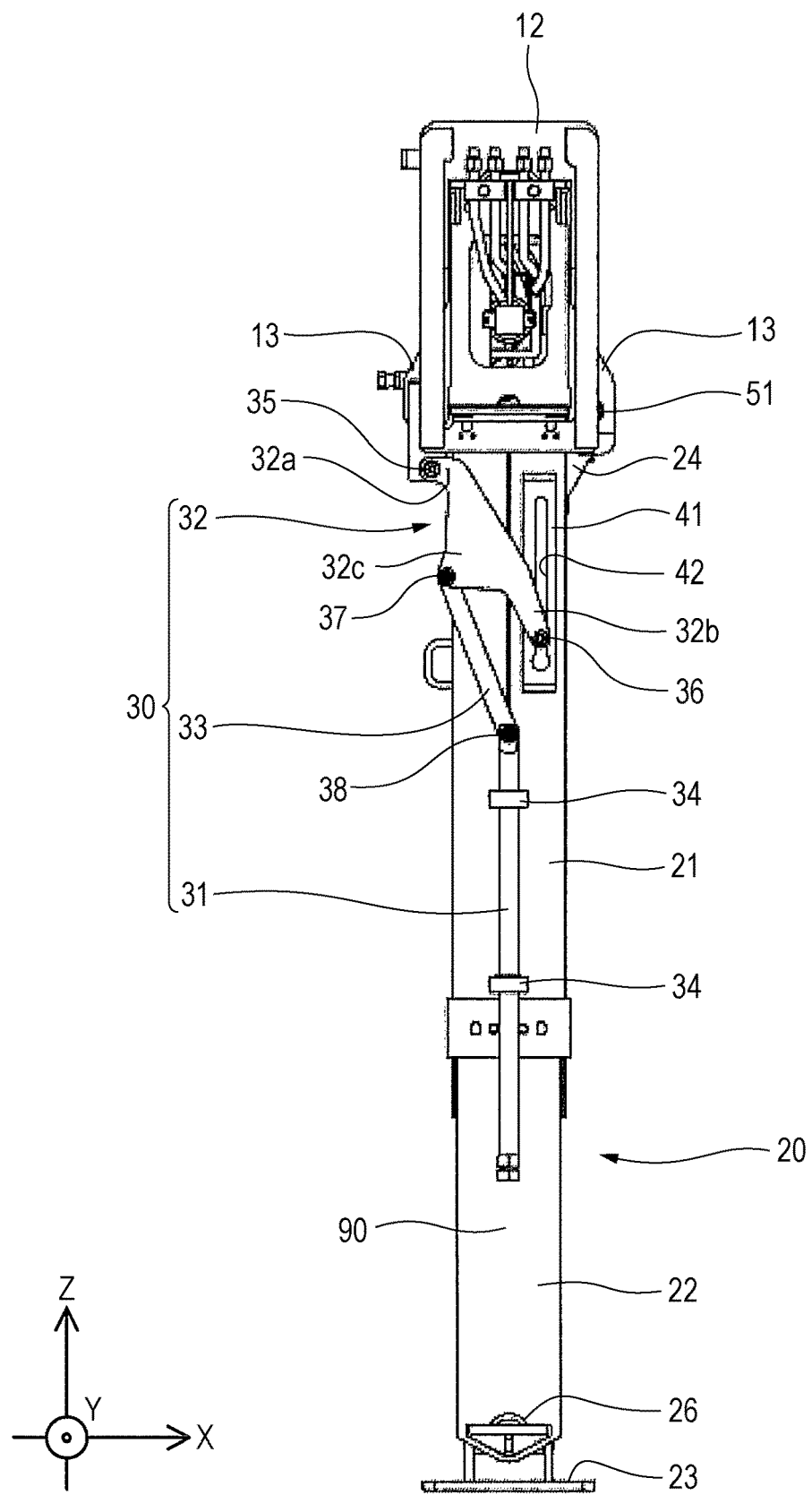
FIG. 8 is a side view illustrating a usage state of a vertical outrigger.

When the vertical outrigger 20 is in the storage state, as illustrated in FIG. 6, the vertical outrigger 20 is held upward in a state where one fulcrum pin 52 is inserted into one first bracket 13 and one second bracket 24. When the vertical outrigger 20 is in the usage state, as illustrated in FIG. 8, one first bracket 13 is coupled to one second bracket 24 by the fulcrum pin 52. In addition, in the usage state, the other first bracket 13 is coupled to the other second bracket 24 by the deployment lock pin 51. In the usage state, the vertical outrigger 20 is firmly fixed to the lateral outrigger 10 in a state where the vertical outrigger 20 faces downward. Incidentally, details of the deployment lock pin 51 will be described later again.

In the pair of outrigger devices 1, each of the vertical outriggers 20 is pin-coupled to a peripheral surface (for example, a front or rear side surface) of the leading end portion of the lateral beam inner casing 12 when viewed from a forward and rearward direction of a truck body. Namely, the vertical outrigger 20 is not attached to the outside of the lateral beam inner casing 12 in the vehicle width direction, but is attached to a portion that is closer to the inside in the vehicle width direction than an outer end surface (also referred to as a leading end surface) of the lateral beam inner casing 12 in the vehicle width direction.

Drive Mechanism for Storage Operation

Subsequently, a drive mechanism for storing the vertical outrigger 20 upward in the outrigger device 1 will be described with reference to FIGS. 8 to 10.

As a configuration element of the foregoing drive mechanism, the outrigger device 1 of the present invention includes a link mechanism 30 that uses the extension and retraction operation of the jack inner casing 22.

The link mechanism 30 uses the retraction operation of the jack inner casing 22 to perform an operation of storing the vertical outrigger 20 upward (in other words, a state where the leading end of the vertical outrigger 20 faces upward) and an operation of installing the vertical outrigger 20 downward (in other words, a state where the leading end of the vertical outrigger 20 faces downward).

In the present embodiment, the link mechanism 30 is provided on an inner surface of the vertical outrigger 20 in the vehicle width direction. In other words, the link mechanism 30 is provided in a space between the inner surface of the vertical outrigger 20 in the vehicle width direction and a part that faces the inner surface in the vehicle width direction.

Specifically, the link mechanism 30 includes a push rod 31 (also referred to as a linear motion member); an oscillating link 32 (also referred to as a rotating member); and a coupling link 33. The width (in other words, the dimension in a rightward and leftward direction in FIG. 8 and the dimension in the forward and rearward direction) of the link mechanism 30 is substantially within the width of the vertical outrigger 20.

The push rod 31 is attached to the jack outer casing 21. Specifically, the push rod 31 is supported on the jack outer casing 21 in a state where the push rod 31 is inserted into holding members 34 that are attached to an inner surface of the jack outer casing 21 in the width direction at two locations in a longitudinal direction. Namely, the holding members 34 are provided on the inner surface of the jack outer casing 21 in the vehicle width direction. The push rod 31 can move along the longitudinal direction (in other words, the direction of the central axis of the jack outer casing 21) of the jack outer casing 21 while being guided by the holding member 34.

The oscillating link 32 is a planar member having a substantially triangular shape, and is pin-coupled to the leading end portion of the lateral beam inner casing 12 and the jack outer casing 21. Specifically, the oscillating link 32 includes an upper end portion 32a; a lower end portion 32b; and a fulcrum portion 32c in FIG. 8. Each of the upper end portion 32a, the lower end portion 32b, and the fulcrum portion 32c includes a hole through which a pin passes. A first pin 35 is inserted into the hole of the upper end portion 32a. A second pin 36 is inserted into the hole of the lower end portion 32b. A third pin 37 is inserted into the hole of the fulcrum portion 32c. The central axes of the first pin 35, the second pin 36, and the third pin 37 are parallel to the vehicle width direction.

The first pin 35 is also inserted into the pin hole of the first bracket 13 which is formed at the leading end of the lateral beam inner casing 12. The first pin 35 is a rotational fulcrum of the oscillating link 32. Namely, the oscillating link 32 can rotate around the first pin 35, which is disposed parallel to the vehicle width direction, in a plane orthogonal to the vehicle width direction (parallel to the forward and rearward direction).

The second pin 36 is guided by a guide member 41 that is provided on the inner surface of the jack outer casing 21 in the vehicle width direction. The guide member 41 includes a guide hole 42 that is long in an upward and downward direction (in other words, the direction parallel to the central axis of the vertical outrigger 20) when the vertical outrigger 20 is in the usage state.

The second pin 36 is inserted into the hole of the lower end portion 32b of the oscillating link 32, and is inserted into the guide hole 42. The second pin 36 can move along a longitudinal direction of the guide hole 42 while being guided by the guide hole 42. The second pin 36 moves in the guide hole 42; and thereby, the jack outer casing 21 is permitted to rotate in a predetermined direction, and this operation will be described in detail later.

The second pin 36 is not limited to being formed of only a pin, and for example, may be a pin provided with a roller. According to such configuration, the second pin 36 can smoothly move in the guide hole 42. A configuration of adopting such pin with a roller is also included in the technical scope of the present invention.

The third pin 37 couples the fulcrum portion 32c of the oscillating link 32 to one end (upper end in FIG. 8) of the coupling link 33. On the other hand, the other end (lower end in FIG. 8) of the coupling link 33 is coupled to one end (upper end in FIG. 8) of the push rod 31 by a fourth pin 38.

In such manner, the coupling link 33 couples the oscillating link 32 to the push rod 31. The coupling link 33 transmits the upward and downward movement (in other words, movement parallel to the central axis of the vertical outrigger 20) of the push rod 31 to the oscillating link 32. The oscillating link 32 rotates in a predetermined direction based on the force transmitted from the coupling link 33.

When the oscillating link 32 rotates as described above, the second pin 36 presses an inner surface of the guide hole 42 in a predetermined direction while sliding upward and downward (along the longitudinal direction of the guide hole 42) in the guide hole 42 of the guide member 41. Due to such pressing, the guide member 41 is pushed sideways to be able to transmit a sideways rotational force (rotational torque) to the vertical outrigger 20.

In this case, since a line segment connecting the third pin 37 and the fourth pin 38 is spaced apart a predetermined distance from the first pin 35, a force is generated to oscillate the oscillating link 32 sideways.

A contact metal 26 is attached to the leading end portion (lower end portion in FIG. 8) of the jack inner casing 22. The contact metal 26 is provided in a leading end portion of an inner surface of the jack inner casing 22 in the vehicle width direction. The contact metal 26 comes into contact with the other end (lower end in FIG. 8) of the push rod 31 from below (in other words, from a leading end side of the vertical outrigger 20) to push the push rod 31 upward (in other words, to move the push rod 31 toward a base end side of the vertical outrigger 20). The contact metal 26 corresponds to an example of a push-up portion.

Namely, when the jack inner casing 22 is drawn into the jack outer casing 21 by the jack cylinder that is built in the vertical outrigger 20, the contact metal 26 pushes the push rod 31 upward. Incidentally, in the usage state, a predetermined gap 90 in the upward and downward direction exists between the contact metal 26 and the push rod 31. Therefore, after the contact metal 26 moves by the dimension of the gap 90 in the upward and downward direction, the contact metal 26 comes into contact with the push rod 31.

As described above, when the push rod 31 is pushed upward (when the push rod 31 moves linearly in the axial direction of the vertical outrigger 20), the coupling link 33 pushes the fulcrum portion 32c of the oscillating link 32. Then, the oscillating link 32 rotates in a clockwise direction in FIG. 8. The rotational torque based on this rotation is transmitted to the guide member 41 and the jack outer casing 21 via the second pin 36. As a result, the vertical outrigger 20 performs a clockwise rotational operation in FIG. 8. This operation is as illustrated in FIGS. 9 and 10, and will be described in detail later.

Safety Device A

Figure 1:
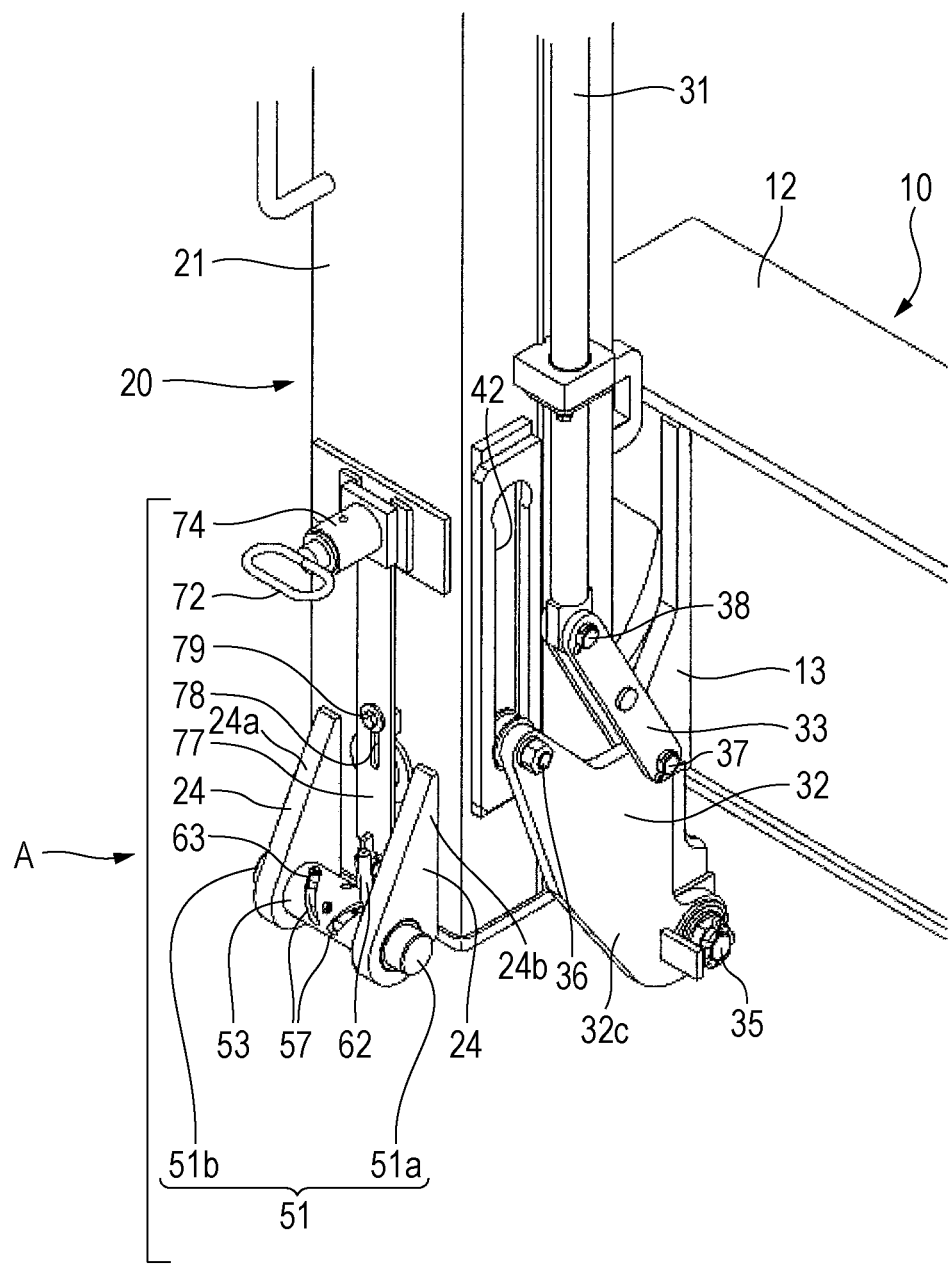
FIG. 1 is a perspective view illustrating a safety device A according to the present invention.

Subsequently, a safety device A which prevents damage during the foregoing storage operation of the vertical outrigger 20 will be described with reference to FIGS. 1 to 5B. Incidentally, FIG. 1 illustrates a state where the vertical outrigger 20 is stored upward, and FIGS. 2A to 5B illustrate a state where the vertical outrigger 20 faces downward. The safety device A may mainly include a switching mechanism 60; a lock mechanism 70; a conjunction member 80; and the like.

1. Switching Mechanism 60

The switching mechanism 60 is a mechanism that switches the deployment lock pin 51 described with reference to FIGS. 6 and 8 between a coupled state and an uncoupled state. The deployment lock pin 51 which is a premise for the application of the switching mechanism 60, and the detailed structure around the deployment lock pin 51 will be described again with reference to FIGS. 2A, 2B, 3A, and 3B.

As illustrated in FIGS. 2A to 4, the vertical outrigger 20 may include the jack outer casing 21; the pair of right and left second brackets 24 provided in an upper end portion of the jack outer casing 21; and the like. Incidentally, the second bracket 24 is indicated by the solid line in FIGS. 2A and 2B, and the second bracket 24 is indicated by the two-dot chain line in FIGS. 3A, 3B, and 4.

The deployment lock pin 51 includes a pair of right and left pin elements 51a and 51b. The pair of pin elements 51a and 51b are inserted into a guide tube 53. Then, the guide tube 53 is fixed between a pair of second bracket elements 24a and 24b of the other (front side in the usage state) second bracket 24. A common central shaft 54 is inserted into the pair of pin elements 51a and 51b. The pair of pin elements 51a and 51b move in an axial direction to be able to approach and move away from each other. In addition, the pair of pin elements 51a and 51b are capable of rotating in the pin insertion hole of the second bracket 24.

Key grooves 55 are formed in the pair of pin elements 51a and 51b. A common key 56 is inserted into the key grooves 55. With such configuration, the pair of pin elements 51*a* and 51*b* rotate synchronously with each other. Namely, the pair of pin elements 51*a* and 51*b* are capable of approaching and moving away from each other while rotating synchronously with each other. The key groove 55 corresponds to an example of a key coupling means.

When the vertical outrigger 20 rotates upward to be stored (namely, in the storage operation), the pair of pin elements 51*a* and 51*b* approach each other to disengage from the first bracket 13.

Subsequently, a specific example of the switching mechanism 60 that switches the deployment lock pin 51 between the coupled state and the uncoupled state will be described.

A cam groove 57 is formed in a tubular body of the guide tube 53. Two cam grooves 57 are provided to form an inverted V shape in a front view illustrated in FIG. 3A. Namely, the two cam grooves are formed such that upper ends of the two cam grooves are close to each other and lower ends are separated from each other. The cam groove 57 corresponds to an example of a cam means.

An operation lever 62 having such size that the operation lever 62 can be gripped with the human hand is attached to one pin element 51*b* of the deployment lock pin 51. In addition, a follower pin 63 which is short is attached to the other pin element 51*a* of the deployment lock pin 51. When an operator grips the operation lever 62 with the hand and rotates the operation lever 62, the operation lever 62 and the follower pin 63 move in the two cam grooves 57. Then, the pair of pin elements 51*a* and 51*b* rotate in a direction where the pin elements 51*a* and 51*b* approach each other or in a direction where the pin elements 51*a* and 51*b* move away from each other. The operation lever 62 corresponds to an example of a pin operation means.

The operation lever 62 is manual as illustrated in the embodiment. It is possible to cause the pair of pin elements 51*a* and 51*b* to approach each other and pull out the pair of pin elements 51*a* and 51*b* from the first bracket 13 by holding and moving the operation lever 62 with the hand toward a side where a gap between the two cam grooves 57 is narrowed, and it is possible to insert the pair of pin elements 51*a* and 51*b* into the first bracket 13 by moving the operation lever 62 toward a side where the gap between the two cam grooves 57 is widened. The coupled state where the vertical outrigger 20 is joined to the lateral beam inner casing 12 is a state where the pair of pin elements 51*a* and 51*b* forming the deployment lock pin 51 are inserted into the first bracket 13, and the uncoupled state is a state where the pair of pin elements 51*a* and 51*b* are pulled out from the first bracket 13.

In the present embodiment described above, the switching mechanism is formed of the operation lever 62 as the pin operation means and the cam grooves 57 as the cam means; however, the present invention can also randomly adopt other means.

For example, instead of using the operation lever 62 which is manual, the pair of pin elements 51*a* and 51*b* may be electrically rotated. In addition, in a case where the pin elements 51*a* and 51*b* are electrically rotated, the pin elements 51*a* and 51*b* may be enabled to approach and move away from each other by using a screw rod and the like instead of using the cam grooves 57. Furthermore, the operation lever 62 which is manual may be coupled to the pair of pin elements 51*a* and 51*b* by a link, and the pair of pin elements 51*a* and 51*b* may be enabled to approach and move away from each other by moving the operation lever 62.

In short, the switching mechanism only needs to be able to switch the deployment lock pin 51 between the coupled state and uncoupled state, and thus, any configuration may be adopted as long as fulfilling the function of the switching mechanism.

2. Lock Mechanism 70

Subsequently, the lock mechanism 70 will be described with reference to FIGS. 2A and 2B.

The lock mechanism 70 mainly includes a regulation pin 71; a pin case 74; and a pin contact portion 76. The regulation pin 71 is a round rod-shaped member in which a pin head 71*a* with a large diameter and a spring receiving shaft 71*b* with a small diameter are formed on the same axis. In addition, a pull knob 72 which is to be pulled with the hand is attached to an outer end surface of the regulation pin 71.

The pin case 74 is a cylindrical member that accommodates the regulation pin 71. The pin case 74 is fixed to an outer surface of the jack outer casing 21. A biasing spring 75 is provided inside the pin case 74. The biasing spring 75 is fitted on an outer periphery of the spring receiving shaft 71*b*. The biasing spring 75 constantly pushes the pin head 71*a* of the regulation pin 71 toward the jack inner casing 22. The biasing spring 75 corresponds to an example of a biasing means.

For this reason, constantly, a leading end portion (specifically, an inner end portion in the vehicle width direction) of the pin head 71*a* of the regulation pin 71 is pushed into the vertical outrigger 20 and is in contact with an upper end of the jack inner casing 22. Incidentally, the pin contact portion 76 is formed at the upper end of the jack inner casing 22.

Figure 2A:
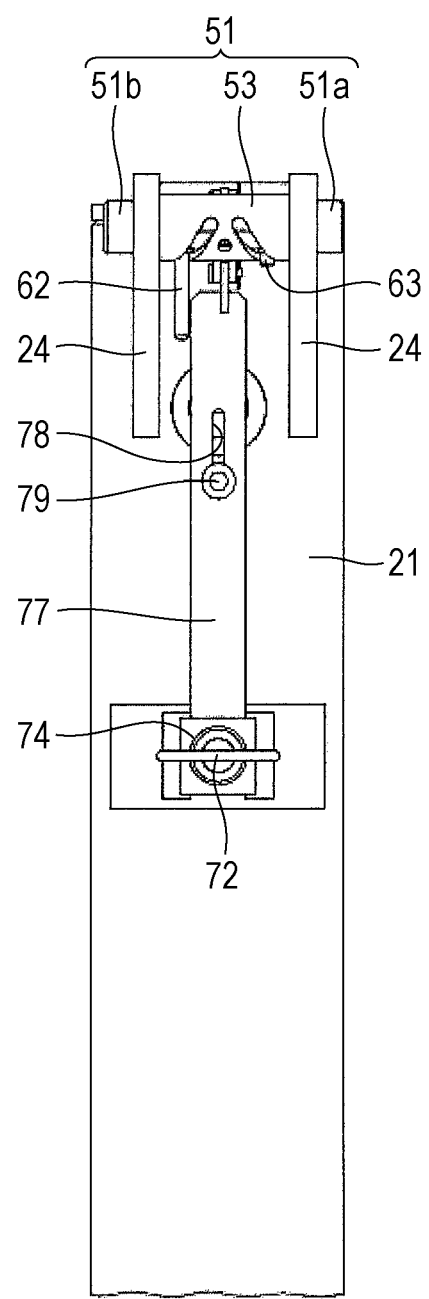
FIG. 2A is a front view for describing a locked state of the safety device A illustrated in FIG. 1.
Figure 2B:
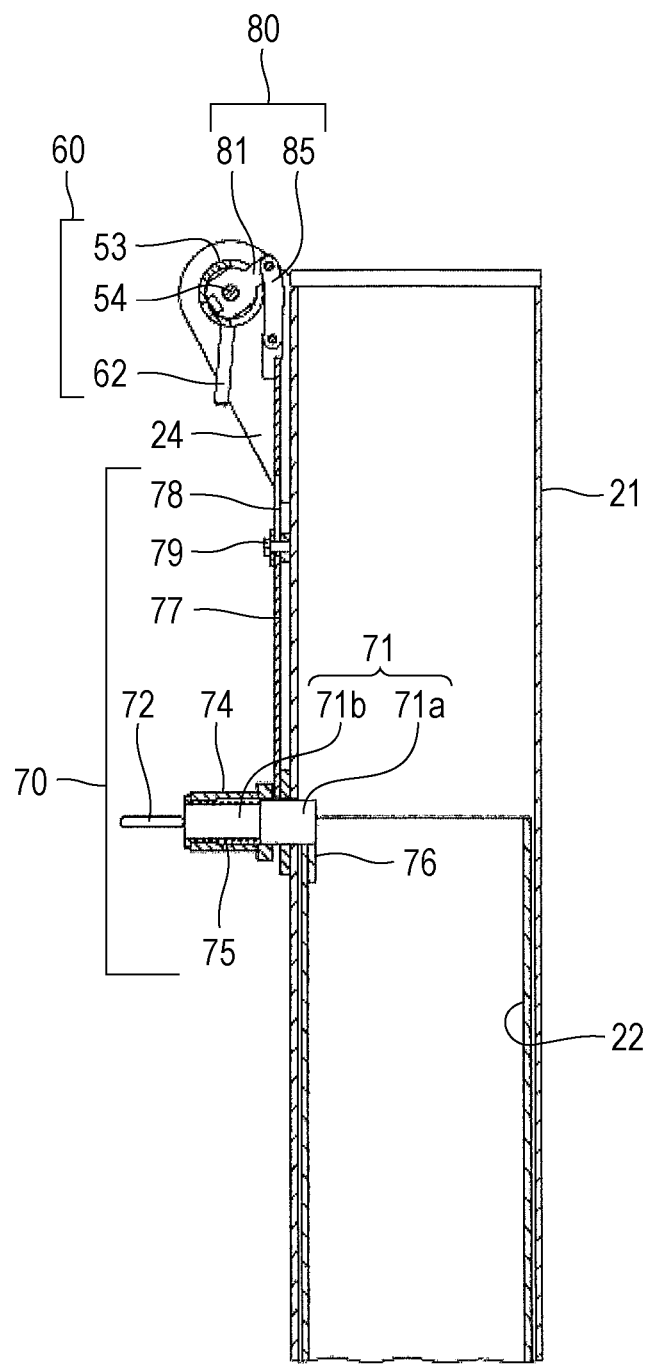
FIG. 2B is a cross-sectional view for describing the locked state of the safety device A illustrated in FIG. 1.
Figure 3A:
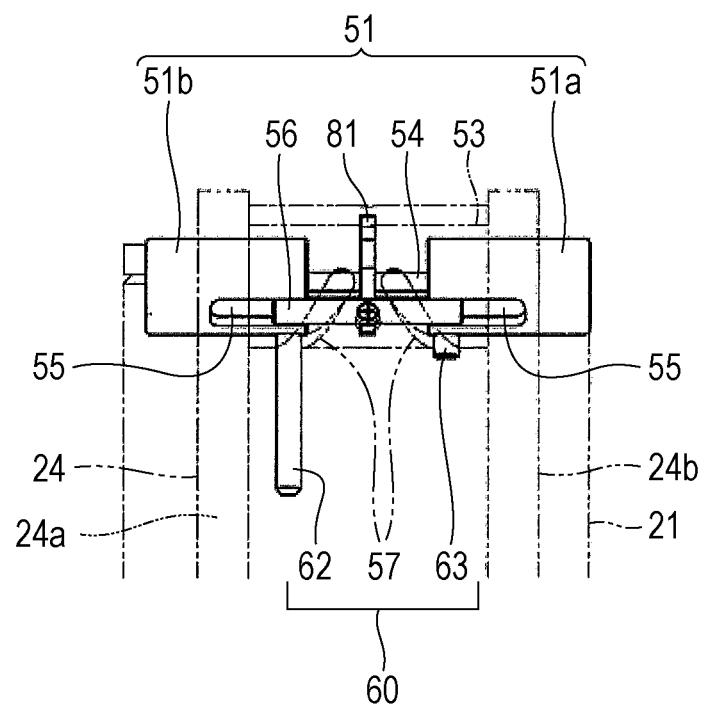
FIG. 3A is a front view for describing a deployment lock pin 51 and a switching mechanism.
Figure 3B:
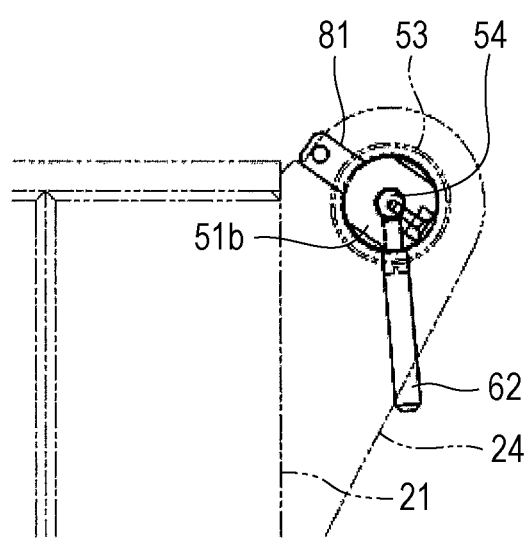
FIG. 3B is a side view for describing the deployment lock pin 51 and the switching mechanism.

As illustrated in FIG. 2B, in a state where the pin head 71*a* of the regulation pin 71 is in contact with the pin contact portion 76 provided in the jack inner casing 22, the jack inner casing 22 can be physically restrained from being drawn into the jack outer casing 21. This state is referred to as a locked state.

Figure 5A:
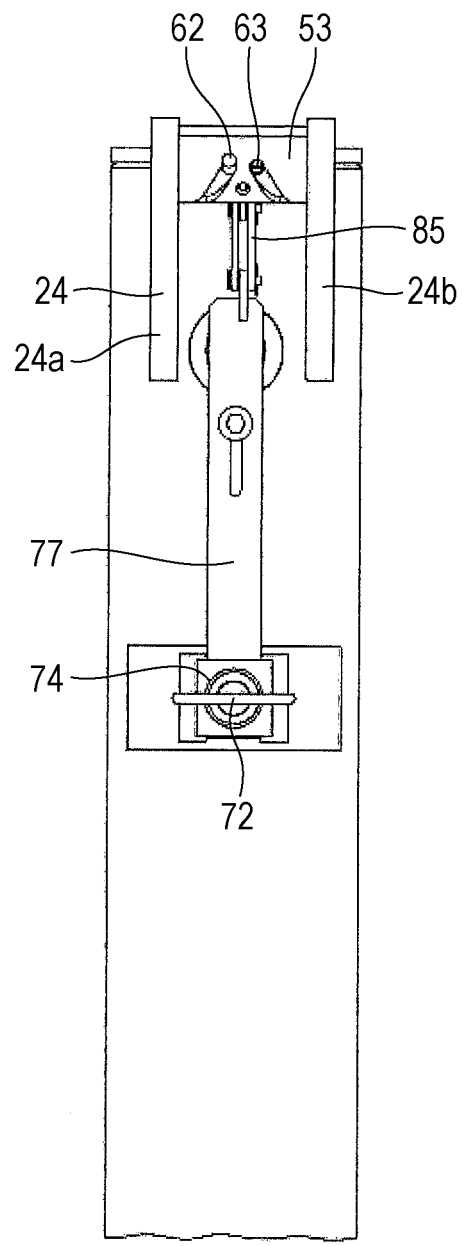
FIG. 5A is a front view for describing an unlocked state of the safety device A illustrated in FIG. 1.
Figure 5B:
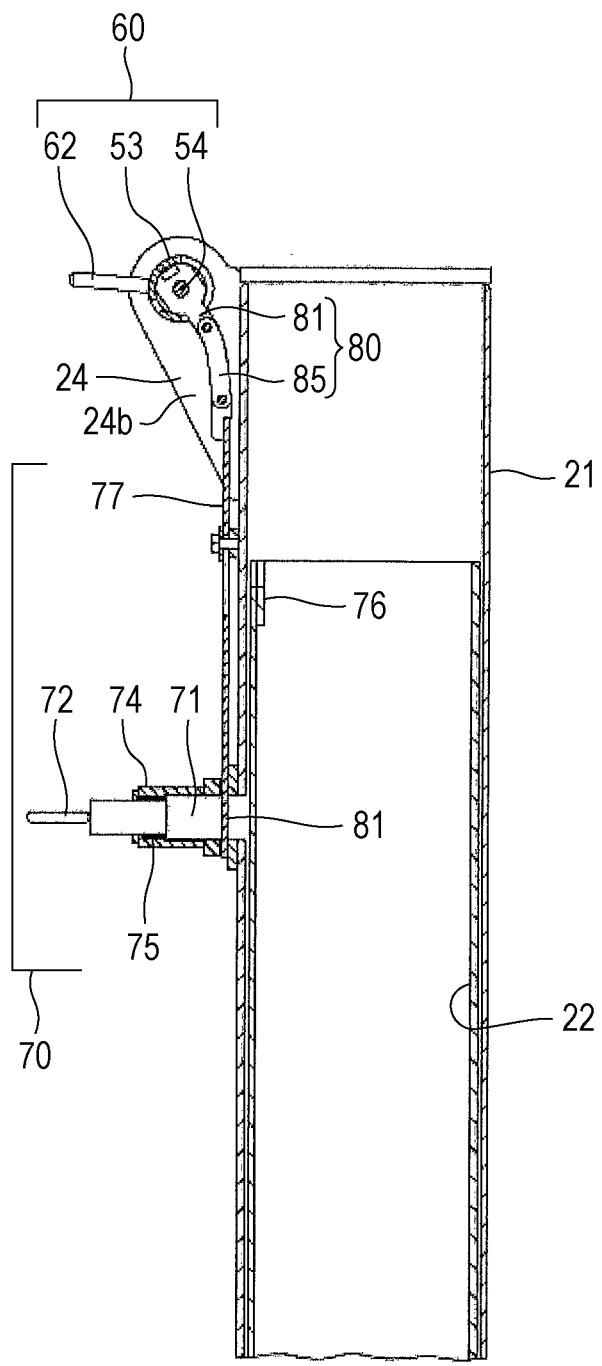
FIG. 5B is a cross-sectional view for describing the deployment lock pin 51 and the switching mechanism.

However, as illustrated in FIG. 5B, when the regulation pin 71 is pulled out, the jack inner casing 22 can be drawn. This state is referred to as an unlocked state.

In the present embodiment described above, the lock mechanism 70 is formed of the regulation pin 71 and the pin contact portion 76 of the upper end of the jack inner casing 22; however, the present invention can also adopt other configurations.

For example, instead of the regulation pin 71, a stopper or the like which restrains the movement of the jack inner casing 22 may be used, and furthermore, an opening and closing valve which is installed in a hydraulic circuit extending and retracting the jack inner casing 22 may be opened and closed.

It is preferable that the lock mechanism 70 has a structure capable of permitting the retraction of the jack inner casing 22 only when the deployment lock pin 51 is in the uncoupled state. The lock mechanism 70 may adopt any configuration as long as such function can be realized with the configuration.

As illustrated in FIGS. 2A, 2B, 5A, and 5B, the restraint member 77 is a rectangular plate-shaped member. A lower end portion of the restraint member 77 can be inserted or pulled out along an inner end of the regulation pin 71. In addition, an upper end portion of the restraint member 77 is coupled to the deployment lock pin 51 via the conjunction member to be described later. The restraint member 77 corresponds to an example of a state holding member.

A long hole 78 is formed in an intermediate part of the restraint member 77. A shaft portion of a guide pin 79 is inserted into the long hole 78. The guide pin 79 is attached to the outer surface of the jack outer casing 21. The long hole 78 and the guide pin 79 are guides for regulating the sliding direction of the restraint member 77.

The restraint member 77 may have a function of restraining the regulation pin 71 in the unlocked state, and a function of releasing the restraint to bring the regulation pin 71 into the locked state. The restraint member 77 is not limited to the illustrated case.

For example, the restraint member 77 may be made of a short plate. In this case, the restraint member 77 made of a plate may be coupled to the conjunction member 80 to be described later by a chain or a control cable.

Furthermore, the regulation pin 71 may be put in and out by using a solenoid. In addition, the restraint member may be configured such that the solenoid, a motor, or the like is coupled to the chain or the control cable to put the regulation pin 71 in and out.

The regulation pin 71 may be automatically pulled out from the vertical outrigger 20 when the deployment lock pin 51 is removed from the first bracket 13. In other words, the lock mechanism 70 may automatically transition from the locked state to the unlocked state when the deployment lock pin 51 is removed from the first bracket 13. A detection device such as a sensor may detect that the deployment lock pin 51 is removed from the first bracket 13.

3. Conjunction Member 80

Subsequently, the conjunction member 80 which transmits the movement of the switching mechanism to the lock mechanism will be described.

Figure 4:
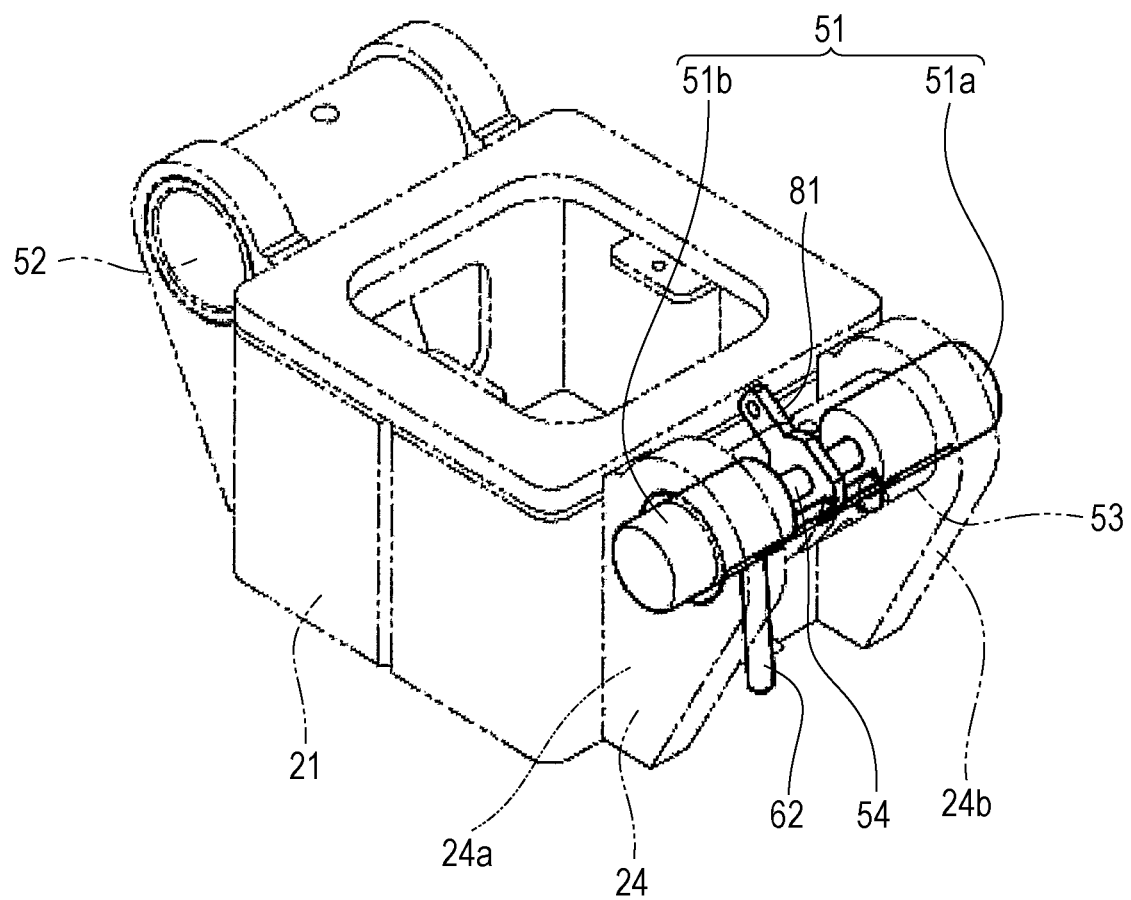
FIG. 4 is a perspective view of the deployment lock pin 51 and the switching mechanism.

As illustrated in FIG. 4, an arm piece 81 extends outward on the central shaft 54 of the deployment lock pin 51 in a radial direction. The arm piece 81 is coupled to an upper end of the restraint member 77 by a link 85.

For this reason, when the operation lever 62 is raised and lowered, the restraint member 77 can also be raised and lowered via the link 85.

The conjunction member 80 only need to be able to conjoin the movement of the switching mechanism 60 to the lock mechanism 70, and is not limited to a combination of the arm piece 81 and the link 85 which are illustrated.

For example, it is possible to adopt random means such as replacing the link with a control cable capable of transmitting a push and pull operation, or realizing conjunction by performing electrical control.

Operation of Safety Device A

FIGS. 2A and 2B illustrate a state where the restraint member 77 is raised to deregulate the movement of the regulation pin 71, and FIGS. 5A and 5B illustrate a state where the restraint member 77 is lowered to restrain the movement of the regulation pin 71.

When the operation lever 62 is lowered in the state illustrated in FIGS. 5A and 5B, as illustrated in FIGS. 2A and 2B, the restraint member 77 is pulled upward, and the regulation pin 71 enters the jack outer casing 21 to engage with the upper end of the jack inner casing 22 and enter the locked state.

As illustrated in FIGS. 5A and 5B, when the operation lever 62 is raised in a state where the pin head 71a of the regulation pin 71 is pulled out from the vertical outrigger 20, the restraint member 77 is pushed downward to enter between the vertical outrigger 20 and a leading end surface of the regulation pin 71. Then, the restraint member 77 performs restraint such that the regulation pin 71 is held at an unlock position to enter into the unlocked state. In this case, the jack inner casing 22 is retractable.

As described above, when the deployment lock pin 51 is brought into the uncoupled state by the operation lever 62, the jack inner casing 22 enters into an eligible state to retract for the first time; and thereby, it is possible to prevent a damage accident caused by forgetting to remove the deployment lock pin 51 when storing the vertical outrigger 20 upward.

Storage Operation of Vertical Outrigger 20

Subsequently, the storage operation of the vertical outrigger 20 will be described.

(1) State Before Storage

FIG. 8 illustrates a state before the vertical outrigger 20 is stored, and also illustrates the usage state (also referred to as the usage state of the vertical outrigger 20) at the same time. In the usage state, the vertical outrigger 20 is positioned below the leading end portion of the lateral outrigger 10 (specifically, the lateral beam inner casing 12).

In other words, in the usage state, an upper end surface (also referred to as a base end surface) of the vertical outrigger 20 faces a lower surface of the leading end portion of the lateral outrigger 10 (specifically, the lateral beam inner casing 12) in the upward and downward direction. In such configuration, the vertical outrigger 20 can receive a load exerted from the lateral outrigger 10 in the own axial direction. For this reason, the support rigidity of the vertical outrigger 20 is improved. In addition, the foregoing configuration contributes to improve the durability of the vertical outrigger 20, after all, the outrigger device 1.

In the usage state, an upper end of the vertical outrigger 20 is firmly fixed to the leading end portion of the lateral beam inner casing 12 of the lateral outrigger 10 with two right and left coupling pins 50 (only the deployment lock pin 51 is illustrated). Therefore, a crane body is stably supported by the jack-up of the vertical outrigger 20.

In order to store the vertical outrigger 20 from this state, the deployment lock pin 51 in FIG. 8 is removed to bring the vertical outrigger 20 into a preparation state where the vertical outrigger 20 can rotate clockwise.

(2) Deregulation

An example of an operation of bringing the vertical outrigger 20 into the foregoing preparation state will be described. Firstly, an operator pulls the pull knob 72 in the state illustrated in FIGS. 2A and 2B. Then, the regulation pin 71 is pulled out from the vertical outrigger 20. Subsequently, the operator raises the operation lever 62 of the safety device A. When the operation lever 62 is raised, the deployment lock pin 51 is removed from the first bracket 13 and the restraint member 77 is pushed downward. Then, the restraint member 77 holds the regulation pin 71 at the unlock position. In this state, the jack inner casing 22 is retractable. Incidentally, the regulation pin 71 may be automatically removed from the vertical outrigger 20 in conjunction with the operation of removing the deployment lock pin 51 from the first bracket 13. In this case, the lock mechanism 70 transitions from the locked state to the unlocked state in conjunction with the operation of removing the deployment lock pin 51 from the first bracket 13.

(3) Rotational Operation of Vertical Outrigger

Subsequently, the jack inner casing 22 retracts. Then, the contact metal 26 comes into contact with the lower end of the push rod 31 to push the push rod 31 upward. This operation can be performed by the retraction operation of the jack cylinder inside the vertical outrigger 20.

Figure 9:
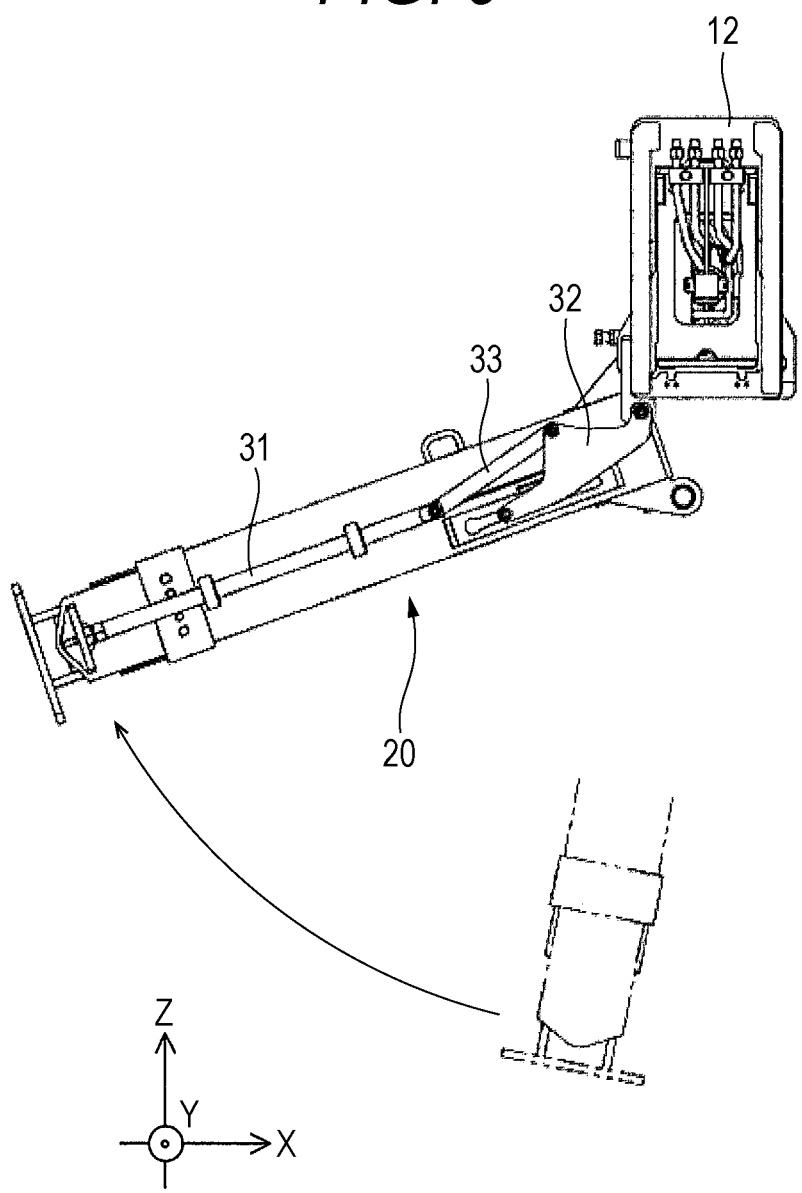
FIG. 9 is a side view illustrating the rotational operation (initial stage of storage) of the vertical outrigger.

As illustrated in FIG. 9, when the push rod 31 pushes the fulcrum portion 32c of the oscillating link 32 via the coupling link 33, the oscillating link 32 rotates clockwise. This rotational operation is transmitted from the second pin 36 to the guide member 41 and the jack outer casing 21, and the vertical outrigger 20 rotates clockwise.

Figure 10:
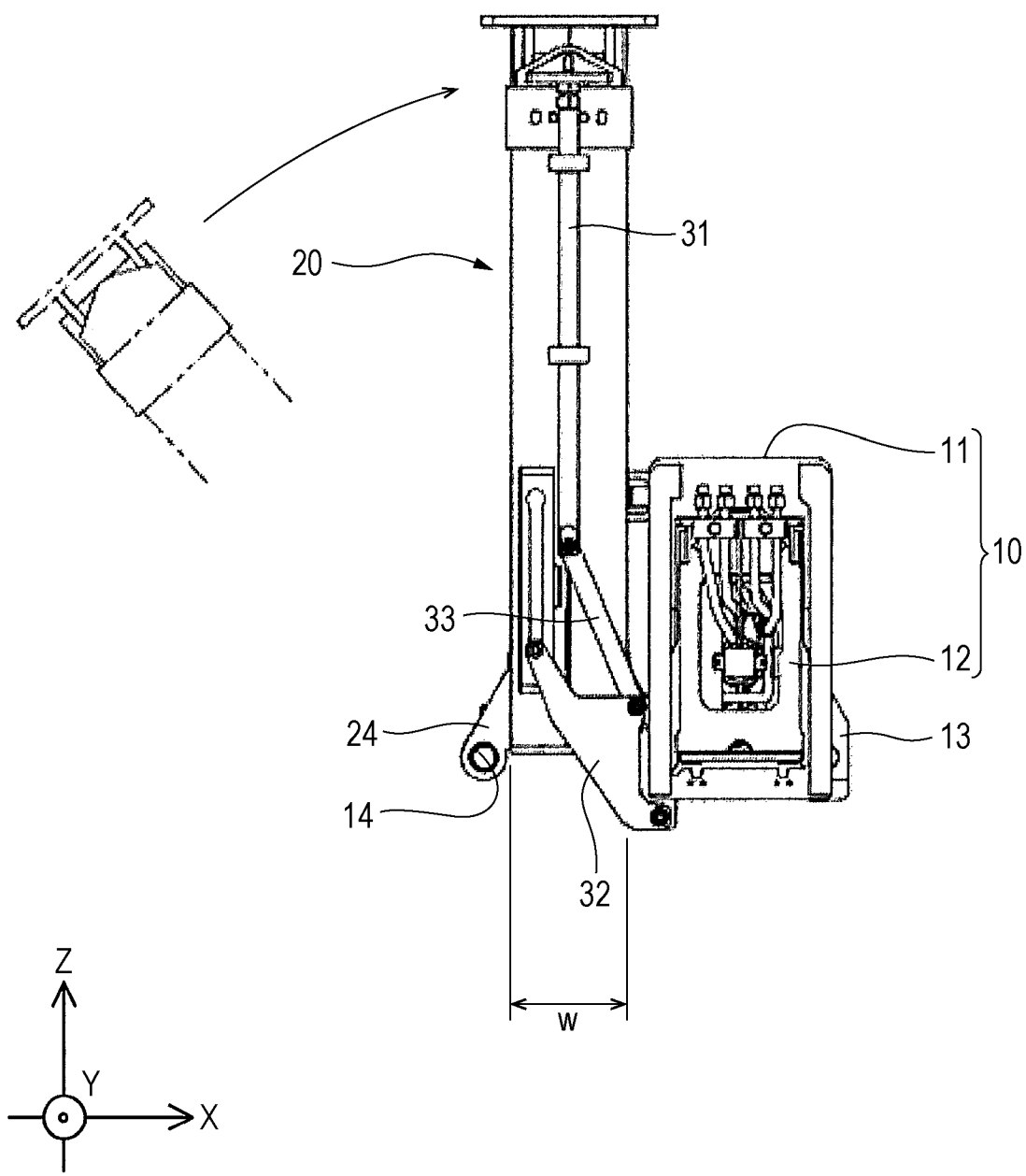
FIG. 10 is a side view illustrating the rotational operation (final stage of storage) of the vertical outrigger.

This rotational operation continues from a state where the vertical outrigger 20 rotates halfway as illustrated in FIG. 9 to a state where the vertical outrigger 20 rotates to stand upward as illustrated in FIG. 10.

In the storage state of the vertical outrigger 20, as illustrated in FIGS. 6 and 7, the vertical outrigger 20 is positioned beside the leading end portion of the lateral beam inner casing 12 in the lateral outrigger 10. In other words, the vertical outrigger 20 is positioned aside in the leading end portion of the lateral beam inner casing 12.

Installation Operation of Vertical Outrigger 20

Subsequently, the installation operation of the vertical outrigger 20 from the storage state to the usage state will be described.

Basically, this can be performed as an operation reverse to the foregoing storage operation. Namely, when the jack cylinder inside the vertical outrigger 20 extends in the state illustrated in FIG. 6, the vertical outrigger 20 rotates counterclockwise via the state in FIG. 9. Then, when the vertical outrigger 20 is manually brought into a state where the vertical outrigger 20 stands downward (refer to FIG. 8), the upper end portion of the vertical outrigger 20 can be fixed to the lateral beam inner casing 12 with the coupling pins 50 (the deployment lock pin 51 and the fulcrum pin 52). In addition, when the vertical outrigger 20 extends, the outrigger device 1 enters into a state of capable of stably supporting the crane body.

Effect of Present Embodiment

According to the present embodiment, when the switching mechanism 60 brings the deployment lock pin 51 into the uncoupled state, the lock mechanism 70 can be held in a deregulated state; and thereby, it is possible to prevent an unsafe operation of storing the vertical outrigger 20 upward in a state where the deployment lock pin 51 remains in the coupled state. Therefore, the link mechanism 30 and the like forming the drive mechanism of the vertical outrigger 20 are not damaged.

Appendix

The present invention can also take the following aspects.

First Aspect

An outrigger device according to a first aspect includes a lateral outrigger including a lateral beam that is laterally mounted on a truck body, and a vertical outrigger that is attached to the lateral outrigger and can switch between a grounded state where the vertical outrigger extends downward and a storage state where the vertical outrigger is retracted upward. The vertical outrigger includes a jack outer casing that is coupled to the lateral beam with a coupling pin, a jack inner casing that is inserted into the jack outer casing, a jack cylinder that extends and retracts the jack inner casing, and a drive mechanism that converts a retraction operation of the jack inner casing into an upward rotational operation of the vertical outrigger. The coupling pin includes a fulcrum pin that serves as a rotational fulcrum when upward storing is performed, and a deployment lock pin that is inserted when downward grounding is performed and is removed when rotation is performed. The outrigger device according to the first aspect includes a safety device that permits the drive mechanism to be driven only when the deployment lock pin is uncoupled.

Second Aspect

According to a second aspect of the outrigger device, in the outrigger device according to the first aspect, the safety device includes a switching mechanism that switches the deployment lock pin between a coupled state where the deployment lock pin is inserted into a bracket provided in the lateral beam and an uncoupled state where the deployment lock pin is removed, a lock mechanism that switches between a regulated state where the jack inner casing is restrained from performing the retraction operation and a deregulated state where the retraction operation is permitted, and a conjunction member that switches the lock mechanism to the deregulated state when the switching mechanism switches the deployment lock pin to the uncoupled state.

Third Aspect

According to a third aspect of the outrigger device, in the outrigger device according to the second aspect, the deployment lock pin includes a guide tube, and a pair of pins that move inside the guide tube in an axial direction, and the switching mechanism includes a pin operation means for synchronously rotating the pair of pins and a cam means for converting a rotational operation of the pin operation means into an approaching and moving away operation of the pair of pins.

Fourth Aspect

According to a fourth aspect of the outrigger device, in the outrigger device according to the third aspect, the lock mechanism includes a regulation pin that restrains the jack inner casing from performing the retraction operation, a biasing means for inserting the regulation pin to a lock position which is a maximum extension position of the jack inner casing, and a restraint member that restrains the regulation pin in an unlock position when the regulation pin is pulled out to the unlock position against the biasing means.

Fifth Aspect

According to a fifth aspect of the outrigger device, in the outrigger device according to the fourth aspect, the conjunction member is a link of which one end is coupled to the pin operation means and the other end is coupled to the restraint member.

Sixth Aspect

According to a sixth aspect of the outrigger device, in the outrigger device according to the third aspect, the pin operation means includes a key coupling means for synchronously rotating the pair of pins in the deployment lock pin, a cam groove that is formed in the guide tube, and an operation lever which is inserted into the cam groove, and of which a base portion is joined to either pin of the pair of pins. In addition, the cam means is a follower pin which is inserted into the cam groove, and of which a base portion is joined to the other pin of the pair of pins in the deployment lock pin. Furthermore, the cam groove is formed such that when the operation lever rotates, the operation lever and the follower pin move away from each other or approach each other.

In the foregoing configuration according to the first aspect, since the safety device is provided, only when the storage operation of the vertical outrigger is performed in a state where the deployment lock pin is brought into the uncoupled state, the drive mechanism is driven to be able to retract the vertical outrigger; and thereby, it is possible to prevent an unsafe operation of storing the vertical outrigger upward in a state where the deployment lock pin remains in the coupled state. For this reason, it is possible to prevent damage to the drive mechanism or the vertical outrigger.

In addition, in the foregoing configuration according to the second aspect, when the switching mechanism brings the deployment lock pin into the uncoupled state, the conjunction member causes the lock mechanism to switch the jack inner casing to the deregulated state; and thereby, it is possible to prevent an unsafe operation of storing the vertical outrigger upward in a state where the deployment lock pin remains in the coupled state.

In addition, in the foregoing configuration according to the third aspect, when the pin operation means is rotated with the hand, the cam means causes the pair of pins to approach each other or move away from each other; and thereby, it is possible to easily switch the deployment lock pin between the coupled state and the uncoupled state with respect to the bracket.

In addition, in the foregoing configuration according to the fourth aspect, when the regulation pin is inserted to the lock position by the biasing means, the jack inner casing can extend to a ground position, and when the regulation pin is pulled out to the unlock position, the jack inner casing can move toward a storage position and the unlock position can be restrained by the restraint member; and thereby, the storage operation of the jack inner casing is interrupted.

In addition, in the foregoing configuration according to the fifth aspect, the conjunction member transmits the operation of the pin operation means to the restraint member; and thereby, it is possible to switch the lock mechanism between the locked state and the unlocked state only by operating the pin operation means that opens and closes the deployment lock pin.

Furthermore, in the foregoing configuration according to the sixth aspect, when the operation lever rotates, the pair of pins in the deployment lock pin rotate synchronously via the key coupling means and the operation lever and the follower pin move along the cam groove; and thereby, it is possible to cause the pair of pins in the deployment lock pin to approach and move away from each other, and it is possible to switch the deployment lock pin between the coupled state and the uncoupled state.

REFERENCE SIGNS LIST

1 OUTRIGGER DEVICE
10 LATERAL OUTRIGGER
11 LATERAL BEAM OUTER CASING
12 LATERAL BEAM INNER CASING
13 FIRST BRACKET
14 PIN INSERTION HOLE
20 VERTICAL OUTRIGGER
21 JACK OUTER CASING
22 JACK INNER CASING
23 FLOAT
24 SECOND BRACKET
24a, 24b SECOND BRACKET ELEMENT
26 CONTACT METAL
30 LINK MECHANISM
31 PUSH ROD
32 OSCILLATING LINK
32a UPPER END PORTION
32b LOWER END PORTION
32c FULCRUM PORTION
33 COUPLING LINK
34 HOLDING MEMBER
35 FIRST PIN
36 SECOND PIN
37 THIRD PIN
38 FOURTH PIN
42 GUIDE HOLE
50 COUPLING PIN
51 DEPLOYMENT LOCK PIN
51a, 51b PIN ELEMENT
52 FULCRUM PIN
53 GUIDE TUBE
54 CENTRAL SHAFT
55 KEY GROOVE
56 KEY
57 CAM GROOVE
60 SWITCHING MECHANISM
62 OPERATION LEVER
63 FOLLOWER PIN
71 REGULATION PIN
71a PIN HEAD
71b SPRING RECEIVING SHAFT
72 PULL KNOB
74 PIN CASE
75 BIASING SPRING
76 PIN CONTACT PORTION
77 RESTRAINT MEMBER
78 LONG HOLE
79 GUIDE PIN
80 CONJUNCTION MEMBER
81 ARM PIECE
85 LINK
90 GAP
100 LOADING TRUCK CRANE
110 GENERAL-PURPOSE TRUCK
111 CAB
112 CARGO BED
113 VEHICLE FRAME
120 SMALL CRANE
121 BASE
122 OUTRIGGER DEVICE
123 LATERAL OUTRIGGER
124 VERTICAL OUTRIGGER
A SAFETY DEVICE

The invention claimed is:
1. An outrigger device that is mounted on a vehicle and can switch between a usage state and a storage state, the device comprising:
a lateral outrigger that extends in a vehicle width direction of the vehicle;

a vertical outrigger that is extendable and coupled to a leading end portion of the lateral outrigger and is rotatable between a usage position corresponding to the usage state and a storage position corresponding to the storage state;
a first coupling member that constantly couples a first part of the vertical outrigger to the lateral outrigger at a rotational center of the vertical outrigger;
a second coupling member that makes the vertical outrigger non-rotatable in the usage position by entering a first state where a second part of the vertical outrigger is coupled to the lateral outrigger and makes the vertical outrigger rotatable by entering a second state where the second part is uncoupled from the lateral outrigger;
a conversion mechanism that rotates the vertical outrigger from the usage position to the storage position by a conversion operation that converts a retraction of the vertical outrigger into an upward rotation of the vertical outrigger; and
a safety device that includes a lock mechanism that can switch between a locked state where the retraction of the vertical outrigger is prohibited and an unlocked state where the retraction of the vertical outrigger is permitted,
wherein the lock mechanism prohibits the conversion operation of the conversion mechanism by prohibiting the retraction of the vertical outrigger in the first state of the second coupling member and permits the conversion operation of the conversion mechanism by permitting the retraction of the vertical outrigger in the second state of the second coupling member.

2. The outrigger device according to claim 1,
wherein the vertical outrigger includes a first vertical outrigger element and a second vertical outrigger element which are extendably combined, and
the lock mechanism includes a lock member that prohibits the retraction by engaging with the first vertical outrigger element and the second vertical outrigger element in the first state.

3. The outrigger device according to claim 2,
wherein the lock mechanism includes a biasing member that constantly biases the lock member in a direction where the lock member is in the locked state, and
the safety device includes a state holding member that moves in conjunction with the second coupling member and holds the lock member in the unlocked state in the second state.

4. The outrigger device according to claim 3,
wherein when the second coupling member transitions from the second state to the first state, the state holding member moves in conjunction with the second coupling member to cause the safety device to transition from the unlocked state to the locked state.

5. The outrigger device according to claim 1,
wherein the conversion mechanism includes a link mechanism that operates based on contact with a push-up portion of the vertical outrigger in an upward and downward direction, to rotate the vertical outrigger upward, and
a predetermined gap exists between the link mechanism and the push-up portion in the first state.

6. The outrigger device according to claim 1,
wherein the safety device includes a switching mechanism that switches the second coupling member between the first state and the second state.

7. The outrigger device according to claim 6,
wherein the second coupling member includes a guide tube, and a pair of pin elements that move inside the guide tube in an axial direction, and
the switching mechanism includes a pin operation means for synchronously rotating the pair of pin elements and a cam means for converting a rotational operation of the pin operation means into an axial movement of the pair of pin elements.

8. The outrigger device according to claim 7,
wherein the pin operation means includes
a key coupling means for synchronously rotating the pair of pin elements,
a cam groove that is formed in the guide tube,
an operation lever which is inserted into the cam groove, and of which a base portion is joined to one pin element of the pair of pin elements, and
a follower pin which is inserted into the cam groove, and of which the base portion is joined to the other pin element of the pair of pin elements in the second coupling member, and
the cam groove is formed such that when the operation lever rotates in a first direction, the operation lever and the follower pin approach each other, and when the operation lever rotates in a second direction, the operation lever and the follower pin move away from each other.

* * * * *